United States Patent [19]

Koepke

[11] E Re. 28,555

[45] Reissued Sept. 16, 1975

[54] ELECTRICAL SWITCH HAVING MOVABLE SPRING CONTACTS WHICH PROVIDE WIPING ACTION WITH ASSOCIATED STATIONARY CONTACTS

[75] Inventor: John Albert Koepke, Des Plaines, Ill.

[73] Assignee: Illinois Tool Works Inc., Chicago, Ill.

[22] Filed: Jan. 29, 1975

[21] Appl. No.: 545,256

Related U.S. Patent Documents

Reissue of:

[64] Patent No.: 3,860,775
Issued: Jan. 14, 1975
Appl. No.: 416,489
Filed: Nov. 16, 1973

[52] U.S. Cl. ..... 200/164 R; 200/159 A

[51] Int. Cl.[2] ..... H01H 1/36

[58] Field of Search ..... 200/159 A, 163, 164 R, 200/159 R, 246, 283, 282, 307, 153 LA, 164 A

[56] References Cited

UNITED STATES PATENTS

| | | | |
|---|---|---|---|
| 1,859,981 | 5/1932 | Norviel | 200/159 R |
| 1,956,361 | 4/1934 | Parker | 200/159 R X |
| 2,521,561 | 9/1950 | Batcheller | 200/163 X |
| 3,017,476 | 1/1962 | Becka | 200/153 LA X |
| 3,061,692 | 10/1962 | Fowler | 200/163 X |
| 3,621,157 | 11/1971 | Schwab | 200/307 X |

*Primary Examiner*—Robert K. Schaefer
*Assistant Examiner*—William J. Smith
*Attorney, Agent, or Firm*—Robert W. Beart; Glenn W. Bowen

[57] ABSTRACT

An electrical switch which has a plastic actuator and one or more movable spring contacts, each of which provide wiping action with a pair of stationary contacts, is disclosed. The stationary contacts are secured to the inner end of rigid leads that are mounted in channels formed in the housing. Each switching station of the switch may be operated as a normally open or alternately as a normally closed switch merely by orienting support members for the wiping contacts in a first direction or in a 180° inverted direction, with respect to a support brace on the actuator. The spring contacts are shaped so they provide wiping action with the stationary contacts when the switch is actuated.

4 Claims, 6 Drawing Figures

ELECTRICAL SWITCH HAVING MOVABLE SPRING CONTACTS WHICH PROVIDE WIPING ACTION WITH ASSOCIATED STATIONARY CONTACTS

Matter enclosed in heavy brackets [ ] appears in the original patent but forms no part of this reissue specification; matter printed in italics indicates the additions made by reissue.

BACKGROUND OF THE INVENTION

*This application is a reissue application of U.S. Pat. application Ser. No. 416,489, filed Nov. 16, 1973, now U.S. Pat. No. 3,860,775.*

In order to reduce the effects of corrosion and the pitting of contacts in electrical switches, it is highly desirable to have a wiping action between two contact members which undergo relative motion so that the surfaces of the contact members will remain smooth and clean. In addition to the employment of wiping action in an electrical switch, it is also highly desirable to be able to provide a switch which has one or more stages that use the same basic switch components, but which may be implemented as either a normally closed or a normally open switch with a minimum of variation in construction of the switching station so that the cost of the switch can be held down.

In the switch of the present invention, each switching station consists of two upwardly extending, relatively rigid contact-carrying leads which are secured in channels formed in the switch housing. The same spring contact member may be employed both for the normally open and the normally closed switch configurations, with the contact member merely being changed from one alignment to a 180° inverted alignment to achieve the other type of switching action.

Thus, it is an object of the present invention to provide a relatively inexpensive, but reliable switch, having one or more switching stations, any one of which may be either a normally open or a normally closed station, wherein the switch comprises a pair of stationary contact-carrying leads for each switching station, an actuator for simultaneously actuating all of the switching stations which supports a spring contact member for each switching station; the orientation of which determines whether the switching station is a normally open or a normally closed switching station and the construction of which provides contact wiping action with the associated pair of stationary contacts.

Other objects and advantages of the present invention will be apparent for the disclosure of this document.

DESCRIPTION OF THE DRAWINGS

The present invention is shown by reference to the drawings in which.

TECHNICAL DESCRIPTION OF THE INVENTION

Figure 1:
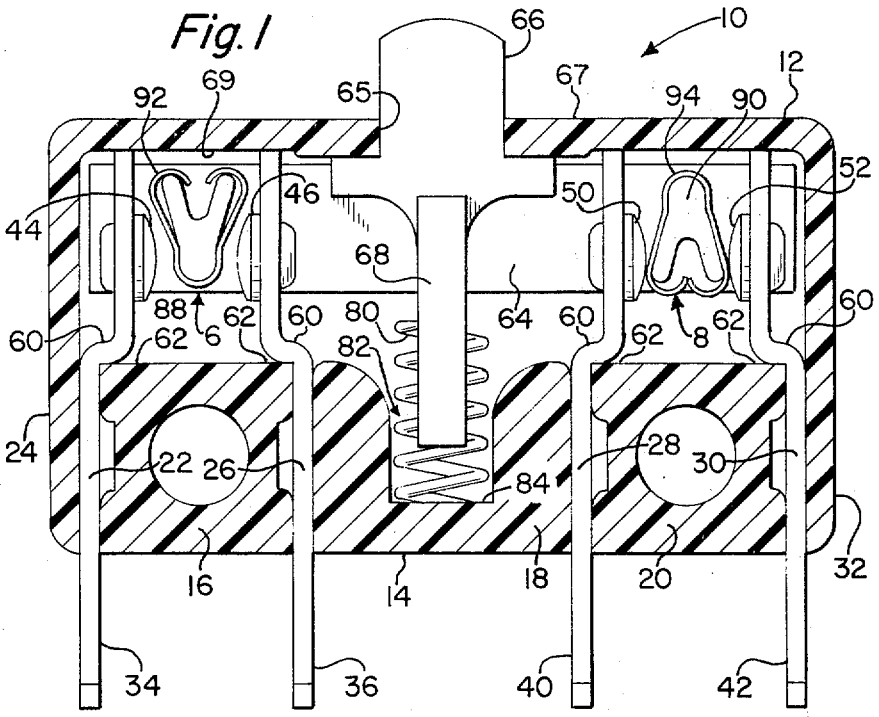
FIG. 1 is a cross-sectional view of a switch constructed in accordance with the present invention in which the actuator is not depressed.
Figure 2:
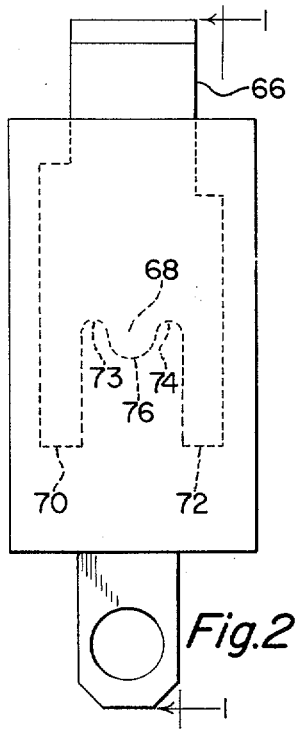
FIG. 2 is an end view of the switch with the outline of the actuator being shown by dotted lines.

The interior of the switch 10 of this invention, with the actuator not depressed, is shown in the cross-sectional view of FIG. 1. The two stage switch of FIG. 1 has a normally open station 6 and a normally closed station 8, it being understood that the switch could have any number of switching stations merely by extending the structure in accordance with the disclosure made herein. The housing 12 for the switch 10 has a generally rectangular box-like shape which is preferably formed of plastics. Integrally formed blocks 16, 18 and 20 extend upwardly from the bottom 14 of the housing 12. A first channel 22 is provided between the block 16 and the lefthand sidewall 24 of the housing 12. A second channel 26 is provided between the blocks 16 and 18, and a third channel 28 is provided between the blocks 18 and 20. A fourth channel 30 is provided between the block 20 and the righthand sidewall 32 of the housing 12.

The normally open station 6 is defined by a pair of relatively rigid leads 34 and 36 which are secured into the channels 22 and 26, respectively. A normally closed station 8 is defined by a second pair of relatively rigid contact leads 40 and 42 which are secured into the channels 28 and 30, respectively. The leads 34 and 36 carry the contacts 44 and 46, respectively, while the leads 40 and 42 carry the contacts 50 and 52, respectively. The leads 34, 36, 40 and 42 have preferably bent sections 60 which allow a portion of the lead to abut against corresponding horizontal surfaces 62 on the outer blocks 16 and 20, to provide for increased terminal pull strength should the leads be pulled from the bottom of the switch housing 10. The lower ends of the leads 34, 36, 40 and 42 extend through the bottom 14 of the housing 12 to receive electrical connection leads (not shown), while the upper ends of these leads preferably abut against the lower surface 69 of the top wall 67 for increased support.

Figure 5:
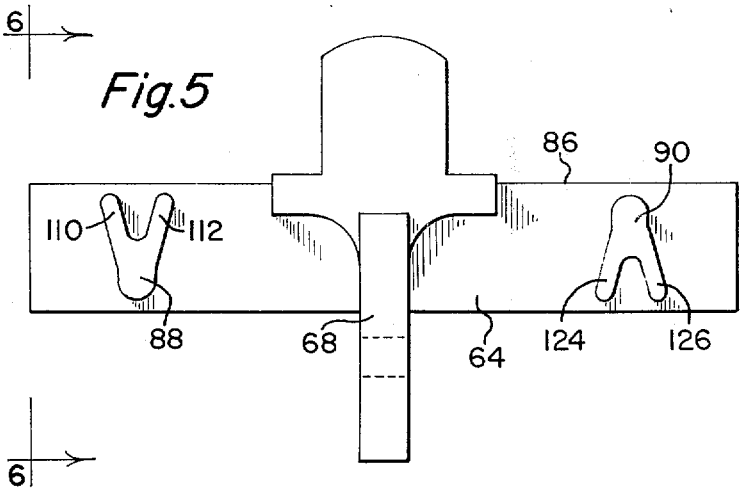
FIG. 5 is a front view of the plastic actuator of the switch.
Figure 6:
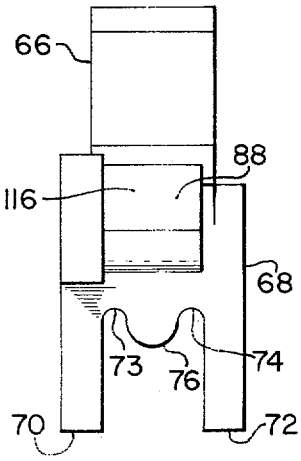
FIG. 6 is an end view of the plastic actuator of the switch.

A one-piece actuator 64, which is best shown in FIGS. 5 and 6, is employed which is preferably molded of plastics. A manual push button 66 is integrally formed on the actuator 64 and extends upwardly through the opening 65 in the top wall 67 of the housing 12. The actuator 64 is formed with a spring retainer 68 that consists of a pair of downwardly extending legs 70 and 72. Two recesses, 73 and 74, are formed at the upper ends of the legs 70 and 72 with a curved projection 76 extending therebetween. The recesses 73 and 74 receive the upper end of a return spring 80 that is utilized to return the actuator 64 to its undepressed position upon release of pressure on the button 66. The center block 18 of the housing 12 has a recess 82 which receives the lower end of the spring 80 so that it bottoms against the surface 84 of the recess 82.

In order to support the movable contacts of the switch 10, the actuator 64 is formed with a relatively thin brace 86 of a generally rectangular cross-sectional shape, which is preferably integrally formed with the actuator 64. The contact support members 88 and 90 are preferably integrally formed on the brace 86 and the metal movable spring contacts 92 and 94 are held on support members 88 and 90, respectively, by their natural resiliency.

Figure 3:
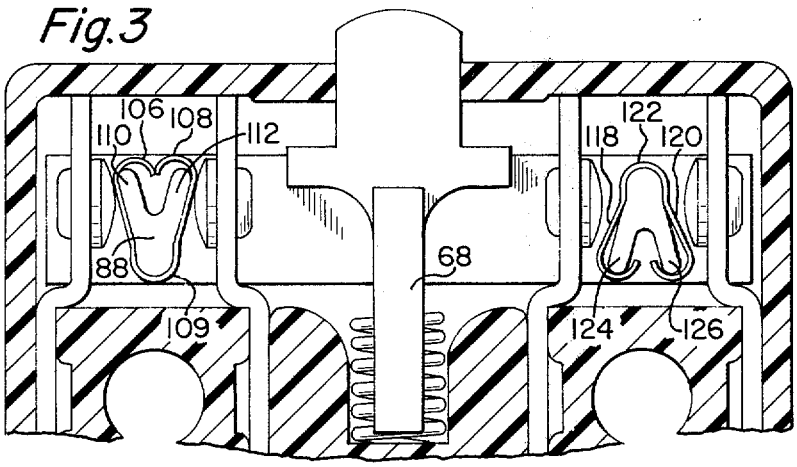
FIG. 3 is a partial cross-sectional view of the switch in which the actuator is depressed.
Figure 4:
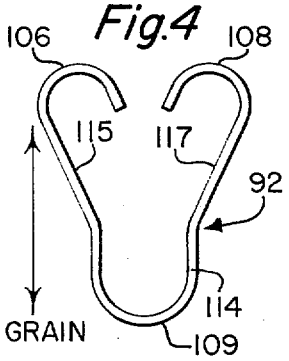
FIG. 4 is a front view of a movable spring contact.

The operation of the switch of the present invention is best shown by reference to FIGS. 1 and 3. FIG. 1 shows the switch when the actuator 64 is not depressed and FIG. 3 shows the switch when the actuator is depressed. When the actuator 64 is not depressed, the movable contact 92 of station 6 does not engage the stationary contacts 44 and 46, but the movable contact 90 of station 8 is in contact with the stationary contacts 50 and 52. The contact 92 has two generally J-shaped resilient sections 106 and 108, the long segments 115 and 117 of which are spaced from associated adjacent portions of the bifurcated arms 110 and 112 of the support member 88 when the actuator 64 is not depressed. The contacts 92 and 94 have a thin, flat shape and are preferably formed of a beryllium-copper alloy, with the grain running in the vertical direction, as indicated in FIG. 4. As shown in FIG. 5, the thickness of the edges 114 of the contacts 92 and 94 is much less than is the width of these contacts which correspond substantially to the width of the sidewall 116 of their respective support members.

The J-shaped sections 115 and 117 of the contact 92 face each other and diverge outwardly at an acute angle from the generally U-shaped connecting section 109. Outer areas of each of the J-shaped sections 115 and 117, respectively, engage the ends of bifurcated arms 110 and 112 at the upper end of the support member 88 so that the external outer ends of the sections 106 and 108 extend adjacent the inner sides of the bifurcated arms 110 and 112, thereby helping to hold the contact 92 in place during operation of the switch. The segments 115 and 117 (shown in FIG. 4) are spaced from the arms 110 and 112 when switching station 6 is open; and they are forced towards, and preferably into engagement with the sides of the arms 110 and 112 when switching station 6 is closed. The U-shaped connecting section 109 is received on the lower end of the support member 88 and is held in place by the resiliency of the contact 92. When the button 66 is depressed, the actuator 64 moves downwardly against the force of the return spring 80, thereby bringing the J-shaped sections 115 and 117 of movable contact 92 into contact with the stationary contacts 44 and 46, respectively, so as to close the circuit between the leads 34 and 36. During the depression and release of the actuator 64, the sections 115 and 117 wipe against the contacts 44 and 46 due to the pressure exerted by contact section 115 on the contact 44 and by pressure exerted by contact section 117 on the contact 46 which results from the natural resiliency of the contact 92. In this manner, a switch having high contact pressure, very low contact bounce and contact wiping action is provided.

The normally closed switching station 8 functions in a similar manner to the operation of the normally open switching station 6 except that this station is initially closed and then opened. The generally J-shaped resilient sections 118 and 120 of contact 94 are initially pressed into contact with the stationary contacts 50 and 52, respectively, as shown in FIG. 1. The J-shaped sections 118 and 120 of the contact 94, which face each other and which diverge outwardly at an acute angle from the generally U-shaped connecting section 122, engage the bifurcated arms 124 and 126 at the lower end of the support member 90. The support member 90 is aligned in a 180° inverted direction from the alignment of the support member 88. Thus, as the actuator button is depressed and then released, the sections 118 and 120 wipe against the contacts 50 and 52, respectively, thereby providing the desired wiping action for the normally closed switching station 8.

While a particular embodiment of the present invention has been shown and described, variations of the present invention within the scope of the invention will be apparent to those skilled in the art.

The invention is claimed as follows:

1. An electrical switch comprising a housing, a switching station comprising a pair of electrically conductive leads each having a stationary contact means thereon, an actuator movable in said housing between first and second positions and having a contact support member associated with said pair of leads, resilient means for biasing said actuator toward its first position and a movable electrical contact means supported by said support member, said movable contact means having first and second *generally J-shaped* resilient contact sections that are joined by a *generally U-shaped* connecting section, [ and ] said first and second *J-shaped* contact sections having segments which are spaced from an adjacent portion of their respective support member when the electrical circuit between said pair of leads is open and which are deflected towards said adjacent portion of said support member by said stationary contact means when said electrical circuit is closed so as to provide a wiping action between said movable and said stationary contact means, [ said movable contact means further having a generally U-shaped connection section and a pair of generally ] *said* J-shaped sections [ which ] *being constructed to* face each other [ and which ] *so as to* diverge outwardly from said U-shaped section at an acute angle, and said support member being constructed to receive said U-shaped connecting section and having a pair of bifurcated arms which are in engagement with said J-shaped sections only at the outer area thereof when said electrical circuit is open.

2. An electrical switch as claimed in claim 1 wherein said circuit between said electrically conductive leads is in either a normally open or a normally closed switching station in accordance with the alignment of said support member and said movable contact means in either a first direction or in a substantially 180° inverted second direction with respect to said actuator.

3. An electrical switch as claimed in claim 1 wherein said leads comprise electrical contacts which form said stationary contact means.

4. An electrical switch as claimed in claim 1 wherein said resilient means is a coiled spring and said actuator is constructed of a single piece of plastic which has said support member formed thereon and which comprises a spring retainer for receiving one end of said coiled spring and a support brace for supporting said support member.

* * * * *